(12) United States Patent
Rigosi et al.

(10) Patent No.: US 6,491,984 B2
(45) Date of Patent: *Dec. 10, 2002

(54) PROCESS FOR COATING METAL SURFACES WITH A POLYOLEFIN COMPOSITION BY FLAME SPRAYING

(76) Inventors: Gian Luigi Rigosi, Via Pomposa 40, 44100 Ferrara (IT); Roberto Marzola, Via Mario Azzi 34, 44100 Ferrara (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/089,419

(22) Filed: Jun. 3, 1998

(65) Prior Publication Data

US 2002/0160122 A1 Oct. 31, 2002

Related U.S. Application Data

(62) Division of application No. 08/977,451, filed on Nov. 24, 1997, which is a continuation of application No. 08/791,207, filed on Jan. 31, 1997, now abandoned.

(30) Foreign Application Priority Data

Jan. 31, 1996 (IT) .......................................... MI96A0165

(51) Int. Cl.⁷ ................................................ B05D 1/08
(52) U.S. Cl. ........................................ 427/447; 427/446
(58) Field of Search .................................. 427/447, 446

(56) References Cited

U.S. PATENT DOCUMENTS 5,304,032 A * 4/1994 Bosna et al. ................ 427/447

FOREIGN PATENT DOCUMENTS

| EP | 0 473 215 A1 | 3/1992 | |
|----|--------------|--------|---|
| EP | 0 575 012 A1 | 12/1993 | |
| EP | 0 603 906 A1 | 6/1994 | |
| WO | 89/10947 | * 11/1989 | ................ 427/447 |
| WO | WO 93/19927 | 10/1993 | |

* cited by examiner

Primary Examiner—Katherine A. Bareford

(57) ABSTRACT

Polyolefin compositions in powder form suited for metal coating, including (percentage by weight):

1) from 1% to 40% of hollow microspheres;
2) from 60% to 99% of a composition comprising:
   a) from 25% to 95% of polypropylene, polyethylene or crystalline propylene copolymers or mixtures thereof;
   b) from 0% to 70% of an elastomeric copolymer;
   c) from 0.5% to 10% of propylene or polyethylene modified with polar groups;
   d) from 0% to 10% of titanium dioxide.

8 Claims, No Drawings

PROCESS FOR COATING METAL SURFACES WITH A POLYOLEFIN COMPOSITION BY FLAME SPRAYING

This application is a division of application Ser. No. 08/977,451, filed Nov. 24, 1997, which is a continuation of application Ser. No. 08/791,207, filed Jan. 31, 1997 and now abandoned.

The present invention concerns a polyolefin composition in powder form filled with hollow microspheres, adequate for the use in processes for the coating of metallic surfaces by way of flame-gun spraying.

BACKGROUND OF THE INVENTION

Published European patent application No. 603 906 describes polyolefin compositions in powder form comprising a crystalline propylene homopolymer or a crystalline propylene random copolymer, an ethylene-propylene or ethylene/1-butene elastomeric polymer, polypropylene modified with polar groups, and optionally a nucleating agent and titanium dioxide.

Said compositions, having a melt index ranging from 15 to 150 g/10 minutes, are adequate for use in processes for the coating of metallic surfaces by using various techniques, among which is flame-gun spraying.

Spraying techniques using flame guns or sprayers allow one to obtain coatings with various degrees of thickness, and generally comprise two stages:

1) heating the metallic surface using a flame or other technique;
2) spraying the polyolefin composition powder while maintaining the flame lit.

However, penetration resistance of the coating obtained with the above mentioned compositions is not particularly high, and for some applications, such as the anticorrosion coating of underground or underwater pipes, it is inadequate.

On the other hand, it is known that the penetration resistance can be improved by adding to polyolefins the proper quantity of hollow microspheres, such as glass microspheres. In particular, published European patent application No. 473 215 describes the preparation of polyolefin compositions containing the above microspheres by treating said microspheres with a degradation agent of the polyolefin chain, and the subsequent mixing with the polyolefins.

The compositions thus obtained are used, among other things, for coating steel pipes by way of extrusion, or wrapping the pipes with a preformed tape.

Compared to the above mentioned technical solution, the polyolefin compositions in powder form of the present invention have the advantage of not requiring any treatment of the microspheres in order to obtain coatings with good physical-mechanical properties. Moreover, flame-gun spraying is easier to apply on the field compared with the extrusion coating techniques, for repairing sections of coating that were either damaged or removed during the application process for example.

Flame-gun spraying is also much less complex in terms of apparatus and operations when compared to the wrap coating with preformed tapes.

Published patent application WO 93/19927 describes an extrusion process for the preparation of insulating material comprising the following stages:

a) a first stage of where a thermoplastic resin, such as polypropylene for example, is fluidized;
b) a second stage where hollow microspheres are added under low shear stress conditions to the fluidized resin of the first stage.

The above mentioned insulating materials can be applied to the outside surface of pipes by way of extrusion or wrapping with ribbons of other preformed materials which are essentially made of the product obtained in stage b).

The extrusion coating technique is not described in detail in the above mentioned patent application, however, since the use of low shear stress in stage b) is necessary in order to avoid breaking the glass microspheres, it is inevitable that said procedure must also be followed during the extrusion coating.

In addition, as shown in published european patent application No. 473 215, coating pipes by way of extrusion is a process that normally requires high shear stress values, therefore said technique can be incompatible with the composition described in application WO 93/19927.

Moreover, patent application WO 93/19927 clearly states that extrusion coating requires the use of molds into which the melted polymer composition is conveyed.

In any case it is inevitable that the extrusion phase used for coating the pipes will cause a degradation of the properties of the material used for said coating, due to the additional breakage of the hollow microspheres and the further degradation of the melted polymer.

On the other hand, the polyolefin compositions in powder form of the present invention are applied to the metal surface simply by way of flame-gun spraying with no need for complicated apparatus, such as extrusion plants and molds where the molten material must be introduced, as well as particularly delicate operating conditions, such as having to use low shear stress. Moreover, applying the compositions of the present invention by way of flame-gun spraying allows one to obtain finished coatings having good physical-mechanical properties, as will be illustrated in the examples. On the other hand, the technical solutions described in the above mentioned documents of the prior art are limited to the preparation of insulating compositions having good physical-mechanical properties, leaving unresolved the problem of how to avoid the degradation of said properties following the application of the insulating compositions on the surface to be coated.

Considering the complexity of the technical solutions of the prior art, which leave unresolved the above mentioned problem, it is particularly surprising that using the coating compositions and process of the present invention one can obtain finished coating with good physical-mechanical properties without using complicated apparatus or having to take burdensome measures, such as pretreating the hollow microspheres.

BRIEF SUMMARY OF THE INVENTION

Therefore, an object of the present invention is a polyolefin composition comprising (percentages by weight):

1) from 1% to 40%, preferably from 10% to 25%, of hollow microspheres;
2) from 60% to 99%, preferably from 75% to 90%, of a polyolefin composition comprising (percentages by weight):
   a) from 25% to 95%, preferably from 50% to 90% of polypropylene homopolymer, polyethylene homopolymer, or a propylene/ethylene, propylene/$C_4$–$C_{10}$ α-olefin, or propylene/ethylene/$C_4$–$C_{10}$ α-olefin crystalline random copolymer, or mixtures thereof;
   b) from 0% to 70%, preferably from 5% to 34%, of an ethylene-propylene or ethylene/$C_4$–$C_{10}$ α-olefin elastomeric copolymer, optionally containing minor quantities of a diene;

c) from 0.5% to 10%, preferably from 2% to 6%, of polypropylene or polyethylene modified with polar groups in quantities ranging from 0.1% to 10%, of preferably from 0.2% to 5%;

d) from 0% to 10%, preferably from 0.6% to 10%, of titanium dioxide;

said polyolefin composition 2) having MFR (ASTM D-1238, condition L) from 2 to 150 g/10 min., preferably from 4 to 30, more preferably from 4 to 12 g/10 min., and being in powder form with not more than 3% of the granules having a diameter greater than 600 micrometers.

DETAILED DESCRIPTION OF THE PREFERRED EMBODIMENTS

Examples of $C_4$–$C_{10}$ α-olefins optionally present in components a) and b) are: 1-butene; 1-hexene; 1-octene; 4-methyl-1-pentene; 6,6-dimethyl-1-pentene.

Examples of dienes optionally present in component b) are: butadiene; 1,4-hexadiene; 1,5-hexadiene, and ethyledene-1-norbornene.

The quantity of $C_4$–$C_{10}$ α-olefins in component a), when present, generally ranges from 2% to 10% by weight.

Examples of preferred polymers for component a) are:

i isotactic polypropylene, having an isotactic index up to 99;

ii propylene/ethylene crystalline random copolymers having an ethylene content ranging from 1% to 7% by weight, more preferably from 2% to 4.5%;

iii propylene/ethylene/1-butene crystalline random copolymers. with a content of ethylene ranging from 1.5% to 3% by weight, more preferably from 2% to 2.2%, and a 1-butene content from 4% to 10% by weight;

iv HDPE and LDPE polyethylene.

Examples of preferred polymers for component b) are the ethylene/propylene or ethylene/$C_4$–$C_{10}$ α-olefin elastomeric copolymers having a content of propylene or $C_4$–$C_{10}$ α-olefin ranging from 30% to 80% by weight.

The dienes, when present in component b), are generally in quantities ranging from 1 to 10% by weight.

The elastomeric copolymers comprised in component b) can be added to the polyolefin composition as is, or as a masterbatch, for example using a propylene/ethylene or propylene/ethylene/1-butene heterophasic copolymer comprising a polypropylene matrix of the same type as component a), and an elastomeric copolymer of the type of component b).

Heterophasic copolymers can be obtained by way of mixing the matrix and the elastomeric copolymer in the molten state, or directly in synthesis by way of sequential copolymerization with high-yield and highly stereospecific Ziegler-Natta catalysts.

Component c) is preferably a polypropylene or polyethylene with various degrees of crystallinity, modified with maleic anhydride or isophorone bismaleamic acid, or acrylic acid. The modification is obtained by operating according to known methods, mixing, in the solid state, in solution, or in the molten state, the polypropylene or polyethylene and the modifying agent, preferably in the presence of radical initiators, such as organic peroxides.

The polyolefin composition 2) is generally prepared by coextruding the various components. For this purpose one uses single-screw or twin-screw extruders of a known type, operating at a temperature that allows one to obtain a fluid mass capable of being extruded. Generally speaking the extrusion temperature ranges from 170° C. to 230° C.

In order to obtain the above mentioned MFRL values, in particular values greater than 12 g/10 min, it may be advantageous to add a free radical generator in extrusion, preferably an organic peroxide. Examples of organic peroxides are: 1,1-bis(tert-butyl peroxy)3,5,5-trimethyl cyclohexane; tert-butyl perbenzoate; 2,2-bis(tert-butyl peroxy) butane; dicumyl peroxide; di-tert-amyl peroxide; di-tert-butyl peroxide; 1,3-bis(tert-butyl peroxyisopropyl)benzene; 2,5-dimethyl-2,5-bis(tert-butyl peroxy)hexane.

The free-radical generators, when required, are generally used in quantities ranging from 0.01% to 0.2% by weight with respect to the sum of components of a), b), and c).

The pellets obtained from the extrusion must then be reduced to a powder having the above mentioned particle size distribution. For this purpose one uses known operation techniques, particularly cryogenic milling, using mills that are cooled with liquid nitrogen, for example. The formation of particularly fine fractions of powder during milling is not a disadvantage for the purpose of the present invention.

The polyolefin powder thus obtained is then mixed with the hollow microspheres in the weight proportions specified above.

The mixing is carried out according to known methods, using dry mixers, such as rotating drum mixers, Battagion mixers, or fluid bed plants.

It has also been found that in cases where high resistance to aging induced degradation is required by the coating, particularly in the case of coatings for pipes destined for hot fluids, it is best to add to the polyolefin composition 2) a stabilizing formulation that is capable of conferring to the above mentioned polyolefin composition oxidation induction time (O.I.T.) values, measured at 220° C. at an oxygen pressure of about 1200 mbar, greater than or equal to 25 minutes, preferably greater than or equal to 30 minutes.

In fact, it has surprisingly been found that by using for the flame-gun spraying powders of polyolefin compositions 2) having the above mentioned O.I.T. values, one obtains finished coatings where the polyolefin component maintains O.I.T. values virtually identical. Said coatings, therefore, maintain constant physical-mechanical properties even after prolonged periods of exposure to heat and oxidizing agents.

On the contrary, when less effective stabilizing formulations are used, thus obtaining polyolefin compositions 2) having O.I.T. values inferior to those previously mentioned, the finished coatings, prepared with said polyolefin compositions by way of flame-gun spraying, show a notable decrease in the O.I.T. values with respect to those of the powders.

As a consequence, the coatings' resistance to aging is further reduced after the flame-gun spraying.

O.I.T. values greater than 25 minutes under the above conditions can be obtained by combining known stabilizing additives in the proper quantity.

Examples of polyolefin compositions 2) having O.I.T. values greater than 25 minutes are those containing (percentages by weight):

e) from 0% to 1.5%, preferably from 0.05% to 1%, of an organic phosphite or phosphonite or mixtures thereof;

f) from 0.8% to 2% of a thioester or an organic polysulfide or mixtures thereof;

g) from 0.45% to 1% of a phenolic stabilizer; the f/g weight ratio ranging from 0.8 to 4.5, preferably from 2 to 4.

Examples of organic phosphites that can be used as stabilizers e) according to the present invention are the compounds having the following general formulas:

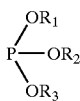 (I)

where $R_1$, $R_2$, and $R_3$, equal or different, are alkyl, aryl, or aralkyl radicals having from 1 to 18 carbon atoms;

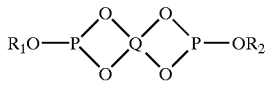 (II)

where $R_1$ and $R_2$, equal or different, are radicals having the meaning mentioned above; Q is a tetravalent alkyl radical;

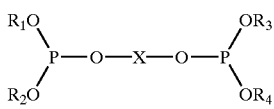 (III)

where $R_1$, $R_2$, $R_3$, $R_4$, equal or different, are alkyl, aryl, or aralkyl radicals having from 1 to 18 carbon atoms. X is an alkyl aryl, or aralkyl bivalent radical.

Examples of organic phosphites comprised in general formula (I) are described. in U.S. Pat. Nos. 4,187,212, and 4,290,941.

Specific examples of compounds comprised in general formulas (I), (II), and (III) are: tris(2,4 di-tert-butylphenyl) phosphite marketed by CIBA GEIGY under the trademark Irgafos 168; distearyl pentaerythritol diphosphite sold by BORG-WARNER CHEMICAL under the trademark Weston 618; 4,4'-butylidenebis(3-methyl-6-tert-butylphenyl-di-tridecyl)phosphite sold by ADEKA ARGUS CHEMICAL under the trademark Park P; tris(mononyl phenyl)phosphite; bis(2,4-di-tert-butyl)-pentaerythritol diphosphite, sold by BORG-WARNER CHEMICAL under the trademark Ultranox 626.

Examples of organic phosphonites that can be used as stabilizers e) according to the present invention are the compounds of formula:

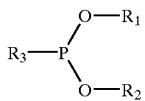 (IV)

where $R_1$, $R_2$, and $R_3$, equal or different, are alkyl, aryl, or aralkyl radicals having from 1 to 18 carbon atoms.

As an alternative the $R_3$, radical can be substituted with

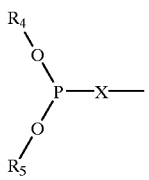 (V)

group, where $R_4$ and $R_5$, equal or different, are alkyl, aryl, or aralkyl radicals having from 1to 18 carbon atoms, and X is an alkyl, aryl, or aralkyl bivalent radical.

Examples of organic phosphonites comprised in general formula (IV) are described in GB patent No. 1372528.

A specific example of compounds comprised in general formula (IV) is the tetrakis(2,4-di-tert-butylphenyl)4,4'-diphenylene diphosphonite, sold by Sandoz under the trademark Sandostab P-EPQ.

Examples of triesters that can be used as stabilizers f) according to the present invention are the compounds of general formula:

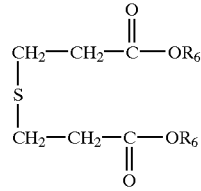 (VI)

where the $R_6$ radicals, equal or different, are linear or branched $C_6$–$C_{20}$ alkyl radicals.

Examples of the thioesters comprised in general formula (VI) are the dilauryl thiodipropionate and the distearyl thiodipropionate.

An other example of thioester is the compound of formula

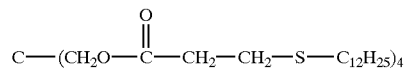

Examples of organic polysulfides that can be used as stabilizers f) according to the present invention are the compounds of general formula:

$R_7$—S—S—$R_7$ (VII)

where the $R_7$ radicals, equal or different, are alkyl, aryl, or aralkyl radicals having from 1 to 20 carbon atoms.

Particularly preferred is the compound of formula (VII) where $R_7$ is a —$C_{18}$—$H_{37}$ radical, sold by Hoechst under the trademark HOSTANOX SE 10.

Examples of phenolic stabilizers that can be used as stabilizers g) according to the present invention are the compounds of formula

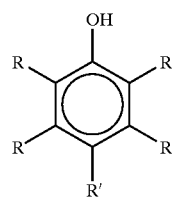 (VIII)

where R' is a —$CHR_2$ or —OR radical; the R radicals, both in formula (VIII) and in R', equal or different, are hydrogen, or linear or branched $C_{1-30}$ alkyl, $C_{3-30}$ cycloalkyl, $C_{6-30}$ aryl, $C_{7-30}$ alkaryl or aralkyl radicals; $C_{1-30}$ alkoxyl; one or more of said R radicals can optionally contain functional groups, in particular piperidine or —COOR", —O—, —S—, —NHR", —NHR"—NHR", —OR" groups, where R" is chosen from hydrogen or linear or branched $C_{1-30}$ alkyl, $C_{3-30}$ cycloalkyl, $C_{6-30}$ aryl, $C_{7-30}$ alkaryl or aralkyl radicals; or two or more of the R and R' radicals are bonded to form cyclic structures; provided that at least one of the two R radicals in position ortho with respect to the —OH group in formula (VIII) is different from hydrogen; or the phenolic stabilizers comprising two or more structural units of formula (VIII) where the R and R' radicals have the meaning described above, with the difference that at least one of them is substituted by a direct bond, or by a functional —O— or —S— group, or by a polyvalent $C_{1-30}$ alkyl radical, linear or branched; $C_{3-30}$ cycloalkyl, $C_{6-30}$ aryl; $C_{7-30}$ alkaryl or aralkyl radical, where said polyvalent radicals can optionally contain the above mentioned functional groups, and all the valences are saturated by structural units of formula (VIII).

Specific examples of the above mentioned phenolic. antioxidants are: 2,6-di-tert-butyl-4-methylphenol; 2-tert-butyl-4,6-dimethylphenol; 2,6-di-tert-butyl-ethylphenol; 2,6-di-tert-butyl-4-i-amylphenol;2,6-dicyclopentyl-4-methylphenol; 2-tert-butyl-4,6-diisopropylphenol; 2-tert-butyl-4,6-dioctadecylphenol; 2,6-di-tert-butyl-4-methoxymethylphenol; 2,5-di-tert-butylhydroquinone; 2,6-dicyclohexylhydroquinone; 2,6-di-tert-butyl-4-hexadecyloxyphenol; 4,4'-hiobis(6-tert-butyl-2-methylphenol); 2,2'-methylene-bis(6-tert-butyl-4-methylphenol); 4,4'-methylene-bis(2,6-di-tert-butylphenol); 1,1-bis(5-tert-butyl-4-hydroxy-2-methylphenyl)butane; 3(3,5-di-tert-butyl-4-hydroxyphenyl)propionate of methyl-octadecyl; 3(3,5-dicyclohexyl-4-hydroxyphenyl)propionate of ethyl or octadecyl;1,3,5-trimethyl-2,4,6-tris(3',5'-ditert-butyl-4-hydroxybenzyl)benzene; tetrakis[methylene(3,5-di-tert-butyl-4-hydroxyhydrocinnamate)]methane; 2,2-bis[4-(2 (3,5-di-tert-butyl-4-hydroxycinnamoiloxy)ethoxyphenyl] propane; pentaerylthrityl-tetrakis[3-(3,5-di-tert-butyl-4-hydroxyphenyl)propionate.

The microspheres that.are used in the compositions of the present invention can be made of plastic or inorganic materials.

Preferably they are made of inorganic glass, in particular silica or a mixture of silica, alkaline metal oxides, and $B_2O_3$.

The density of the microspheres generally ranges from 0.05 and 0.6 g/cm$^3$, preferably from 0.1 to 0.5 g/cm$^3$.

The diameter of the microspheres generally ranges from 10 to 150 μm, preferably from 30 to 70 μm.

Known types of guns or sprayers are used for the flame-gun. spraying.

Typically, said guns or sprayers have a central hole for spraying the powders and one or more circles of holes, for the flame, which are concentric to the central hole.

One can also feed inert gas, such as nitrogen for example, through said holes in order to protect the polymer from the oxidation caused by the flame.

The flame-gun spraying is carried out following known techniques.

As previously stated, said techniques generally comprise two stages:

1) heating the metallic surface with a flame or other heating devices, such as induction ovens for example;
2) spraying the polyolefin composition filled with microspheres while maintaining the flame lit.

In stage 1) the surface is bought to a temperature that ranges preferably from 150 to 270° C.; in stage 2) one operates in a way that causes the total melt of the polymer mass. Preferably in stage (2) the polymer mass is brought to a temperature ranging from 180 to 230° C.

Should one want to obtain thick coatings (for example from 2 to 20 mm) it is possible to deposit a number of layers, equal or different, of the above mentioned polyolefin compositions.

Before depositing the polyolefin composition, the surface to be coated can be treated in a variety of ways, such as the removal of all greasy substances and encrustations, and sanding. In order to improve the adhesion it may also be of advantage to apply a primer to the metallic surface to be coated. Examples of said primers are epoxy resins; that can be applied by way of flame-gun spraying, or used in solution in the proper solvents, and the aqueous solutions of chromates Envoy (10% by weight, for example). In either case the solvent is removed with heat before depositing the polyolefin composition.

The above mentioned flame-gun spraying process is particularly suited for coating the outer surface of metal pipes, in particular steel pipes for oil pipe-lines, and pipes in general.

The following examples are given in order to illustrate but not limit the present invention.

The polyolefin composition 2) used for the coating of the examples comprises (percentages by weight):

a) 73.52% of a propylene/ethylene/1-butene crystalline random copolymer containing 2% of ethylene and 8% of 1-butene;

b) 19.5% of a masterbatch consisting of a heterophasic copolymer containing 50% of a crystalline propylene random copolymer comprising 3.5% of ethylene and 50% of an ethylene/propylene elastomer which contains 27% of ethylene;

c) 3.4% of a propylene homopolymer modified with maleic anhydride, containing 1.5% of grafted maleic anhydride, and 0.3% of free maleic anhydride;

d) 0.68% of $TiO_2$;

f) 1.5% of dilauryl thiodipropionate;

g) 1.4% of Irganox B 225.

The Irganox B 225 is a stabilizing composition containing 50% by weight of pentaerythrityl-tetrakis[3-(3,5-di-tert-butyl-4-hydroxyphenyl)]propionate (Irganox 1010) and 50% by weight of Sandostab P-EPQ, which is a stabilizer based of tetrakis(2,4-di-tert-butylphenyl)4,4'-diphenylilene diphosphonite.

The above mentioned polyolefin composition has a MFR (ASTM D1238, condition L) of 10 g/10 min., and is a powder where not more than 3% of the granules by weight have a diameter greater than 600 micrometers.

EXAMPLE 1

A filled composition is prepared by dry mixing 80% by weight, of the polyolefin composition 2), and 20% by weight of hollow glass microspheres 1).

Glass microspheres 1) used are the Scotchlite B 38/4000, marketed by 3M Italia, having an average density of 0.38 g/cm$^3$, and an average wall thickness of 1.07 micrometers. One proceeds with the coating of a steel plate which had been previously sanded, operating in the following manner:

the steel plate is heated to 200° C. on a heating plate;

on the surface of the steel plate to be coated is applied, using an electrostatic gun, the powdered epoxy resin Scotchkote 226 N Slow marketed by 3M Italia;

the filled composition is deposited on the epoxy resin coated surface in a number of consecutive layers, using a flame-spraying MINI-SPRAY-JET gun manufactured by UTP (Germany), until the thickness of the coating reaches about 5 mm.

The above mentioned gun has a central hole, from which the filled composition comes out, and a circle of holes, concentric to the central hole, which is where the flame comes out, said flame being fed by an oxygen/propane mixture. The temperature of the polymer mass during spraying is maintained at about 200° C.

The coating is subjected to a peeling test at 120° C. according to DIN 30678, obtaining a peeling value greater than 7N/mm.

Other properties of the coating are reported on Table 1.

EXAMPLE 2

The operation takes place as in Example 1, with the difference that one uses a filled composition obtained by dry mixing 80% by weight of the polyolefin composition 2) described above, and 20% by weight of hollow glass Scotchlite K25 microspheres 1) having an average density of 0.25 g/cm$^3$, and an average wall thickness of 0.95 micrometers.

The resulting coating has a thickness of 7–8 mm. The properties of said coating are reported in Table 1.

From the density values shown in Table 1 one can conclude that the majority of the glass spheres did not break. In fact the calculated density values for the coatings of Examples 1 and 2 are 0.71, and 0.65 cm$^3$/g respectively.

TABLE 1

|  | Ex. 1 | Ex. 2 |
|---|---|---|
| Density (g/cm$^3$) | 0.77 | 0.71 |
| Thermal conductivity (W/mK) | 0.16 | 0.15 |
| Penetration at 23° C. (mm) | 0.09 | 0.06 |
| Penetration at 100° C. (mm) | 0.5 | 0.5 |
| Compression module at 5% of deformation (MPa) | 455 | 395 |

The properties reported in Table 1 are measured using the following methods.

| Property | Method |
|---|---|
| Density | BS 4370 |
| Thermal conductivity | ASTM C518 |
| Penetration at 23° C. and 100° C. | DIN 30678 |
| Compression module at 5% of deformation | ASTM D 695 |

Comparative Example 1

Polyolefin composition 2) described above is subjected to an induction oxidation time (O.I.T.) evaluation using the following method.

The surface of a steel plate is coated operating as in Example 1, but using the polyolefin composition 2) as is, i.e., without adding the hollow glass microspheres 1).

A sample of the coating obtained in this manner is taken after having detached it from the metal, and is then put into a test tube. Said test tube is connected to an apparatus that is capable of producing a vacuum, in order to eliminate the air, and then oxygen is introduced to build up the pressure in the test tube. In this case, after the vacuum is complete, pure oxygen is introduced in the test tube until a pressure of 1200 mbar is reached.

The test tube is then put in a thermostatic bath and heated.

Said test tube is connected to a pressure transducer that allows the registration of the oxygen pressure in function of the time.

Thus one obtains a pressure/time diagram that comprises two segments which are almost rectilinear:

an initial segment slightly descending (the pressure initially undergoes a moderate decrease);

a subsequent line rapidly descending with time.

By prolonging the above mentioned lines one reaches a point where said lines intersect, and at said point one can read in the diagram the oxidation induction time, that is co say the time when the polymer starts to absorb significant quantities of oxygen.

The above mentioned sample of polyolefin composition 2) of Examples 1 and 2 shows oxidation induction times of 72 minutes at 210° C., and 35 minutes at 220° C.

By carrying out the same test on the powder of composition (I) as is, i.e., without having been subjected to flame-gun spraying, one obtains oxidation induction times of 75 minutes at 210° C. and 34 minutes at 220° C.

Therefore, it is clear that the above mentioned polyolefin composition is highly resistant to oxidation at high temperatures, and that said oxidation resistance is not substantially reduced after flame-gun spraying.

Comparative Example 2

One produces a polyolefin composition of the same type as the polyolefin composition 2) of Examples 1 and 2, with the difference that less quantities of components f) and g) are used. Said composition, therefore, comprises (percentages by weight):

a) 7.5.3% of a propylene/ethylene/1-butene crystalline random copolymer containing 2% of ethylene and 8% of 1-butene;

b) 20% of a masterbatch consisting of a heterophasic copolymer containing 50% of a crystalline propylene random copolymer comprising 3.5% of ethylene and 50% of an ethylene/propylene elastomer which contains 27% of ethylene;

c) 3.5% of a propylene homopolymer modified with maleic anhydride, containing 1.5% of grafted maleic anhydride, and 0.3% of free maleic anhydride;

d) 0.7% of $TiO_2$;

f) 0.3% of dilauryl thiodipropionate;

g) 0.2% of Irganox B 225.

The above composition has a MFR of 9 g/10 minutes, and is a powder where not more than 3% of the granules have a diameter greater than 600 micrometers.

By subjecting said composition to the test of comparative Example 1, one obtains an oxidation induction time at 200° C. of 7.5 minutes for the sample deriving from the flame-gun spraying, and 20 minutes for the powder as is.

Other features, advantages and embodiments of the invention disclosed herein will be readily apparent to those exercising ordinaly skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. Process for coating metallic surfaces comprising the flame-gun spraying of a polyolefin composition consisting essentially of (percentages by weight):

1) from 1% to 40% of hollow microspheres;

2) from 60% to 99% of a polyolefin composition consisting essentially of (percentages by weight):

a) from 25% to 95% of polypropylene homopolymer, polyethylene homopolymer, or a propylene/ethylene, propylene/$C_4$–$C_{10}$ α-olefin, or propylene/ethylene/$C_4$–$C_{10}$ α-olefin crystalline random copolymer, or mixtures thereof;

b) from 0% to 70% of an ethylene-propylene or ethylene/$C_4$–$C_{10}$ α-olefin elastomeric copolymer, optionally containing minor quantities of a diene;

c) from 0.5% to 10% of polypropylene or polyethylene modified with polar groups in quantities ranging from 0.1% to 10%;
d) from 0% to 10% of titanium dioxide;
e) from 0% to 1.5% of an organic phosphite or phosphonite or mixtures thereof;
f) from 0.8% to 2% of a thioester or an organic polysulfide or mixtures thereof; and
g) from 0.45% to 1% of a phenolic stabilizer, the f/g weight ratio ranging from 0.8 to 4.5;

said polyolefin composition 2) having Melt Flow Rate ("MFR") (ASTM D-1238, condition L) from 2 to 150 g/10 min., having oxidation induction time values, measured at 220° C. and at an oxygen pressure of about 1200 mbar, greater or equal to 25 minutes, and being in powder form with not more than 3% of the granules having a diameter greater than 600 micrometers, and wherein said microspheres have not been treated with a polyolefin chain degradation agent prior to contact with said polyolefin composition, on the above mentioned surfaces.

2. Process for coating metal pipes, comprising the flame-gun spraying of the compositions of claim 1 on the outer surface of said metal pipes.

3. Process for coating metallic surfaces comprising the flame-gun spraying of the compositions of claim 1, where component a) comprises one or more polymers selected from the group consisting of:

i isotactic polypropylene, having an isotactic index up to 99;

ii propylene/ethylene crystalline random copolymers having an ethylene content ranging from 1% to 7% by weight, iii propylene/ethylene/1-butene crystalline random copolymers with a content of ethylene ranging from 1.5% to 3% by weight, and a 1-butene content from 4% to 10% by weight;

iv HDPE and LDPE polyethylene, on the above mentioned surfaces.

4. Process for coating metal pipe comprising the flame-gun spraying of the compositions of claim 3 on the outer surface of said metal pipes.

5. Process for coating metallic surfaces comprising the flame-gun spraying of the compositions of claim 1, wherein the hollow microspheres 1) have a density ranging from 0.05 to 0.6 g/cm$^3$, on the above mentioned surfaces.

6. Process for coating metal pipes, comprising the flame-gun spraying of the compositions of claim 5 on the outer surface of said metal pipes.

7. Process for coating metallic surfaces comprising the flame-gun spraying of the compositions of claim 1, where the hollow microspheres 1) are made of inorganic glass, on the above mentioned surfaces.

8. Process for coating metal pipes, comprising the flame-gun spraying of the compositions of claim 7 on the outer surface of said metal pipes.

* * * * *